Figure 20:
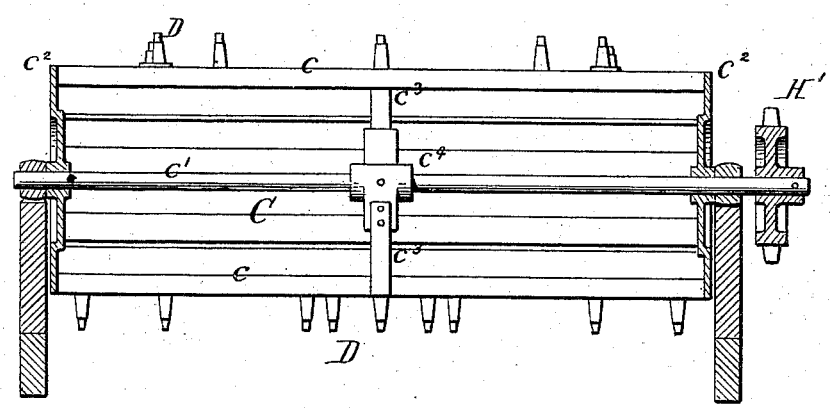

No. 695,212. Patented Mar. 11, 1902.
J. S. KEMP.
FERTILIZER DISTRIBUTER.
(Application filed June 3, 1901.)
(No Model.) 4 Sheets—Sheet 1.
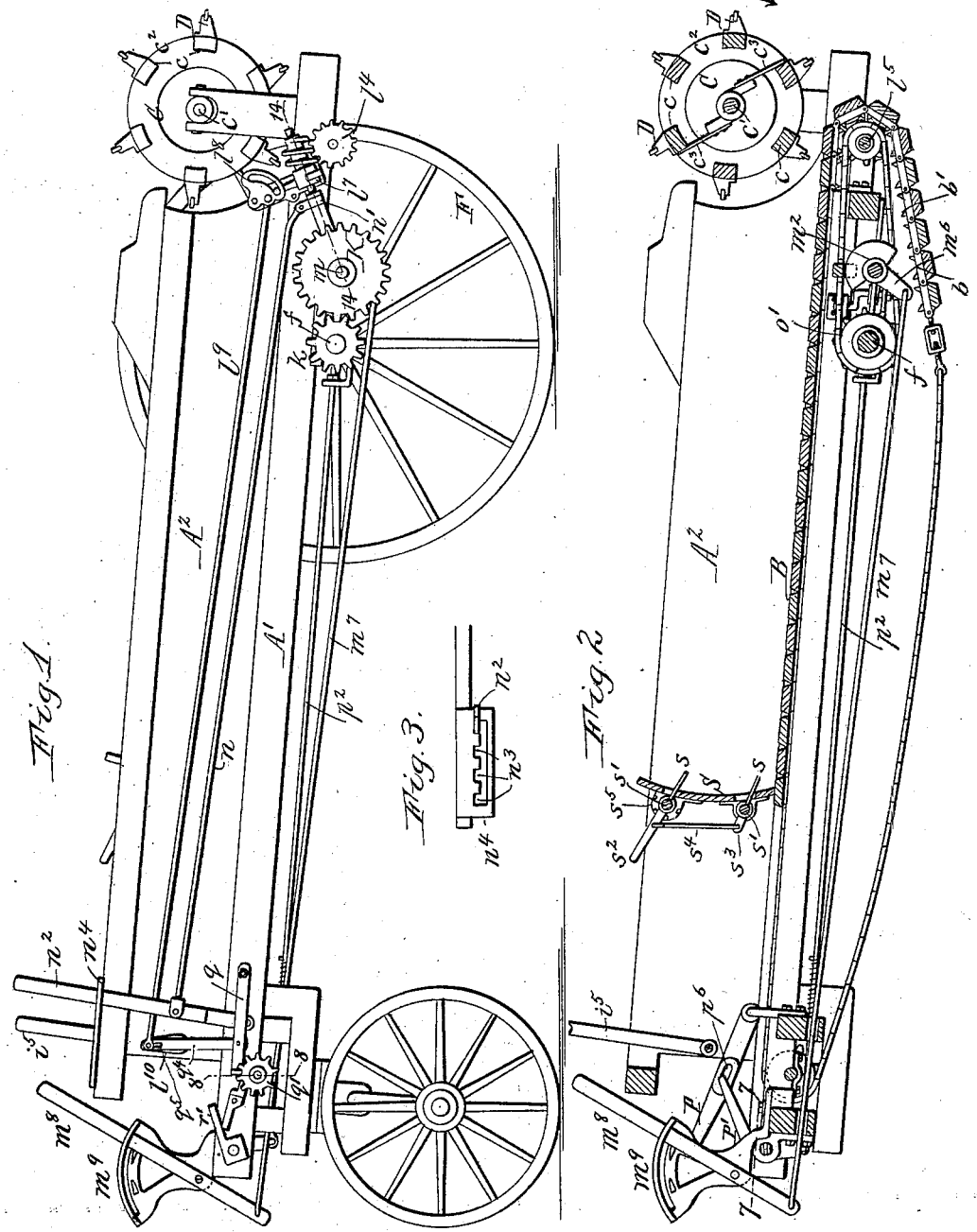
Witnesses: Joseph S. Kemp, Inventor.
Henry L. Deck. By Wilhelm Bonner
F. F. Schijinger Attorneys.

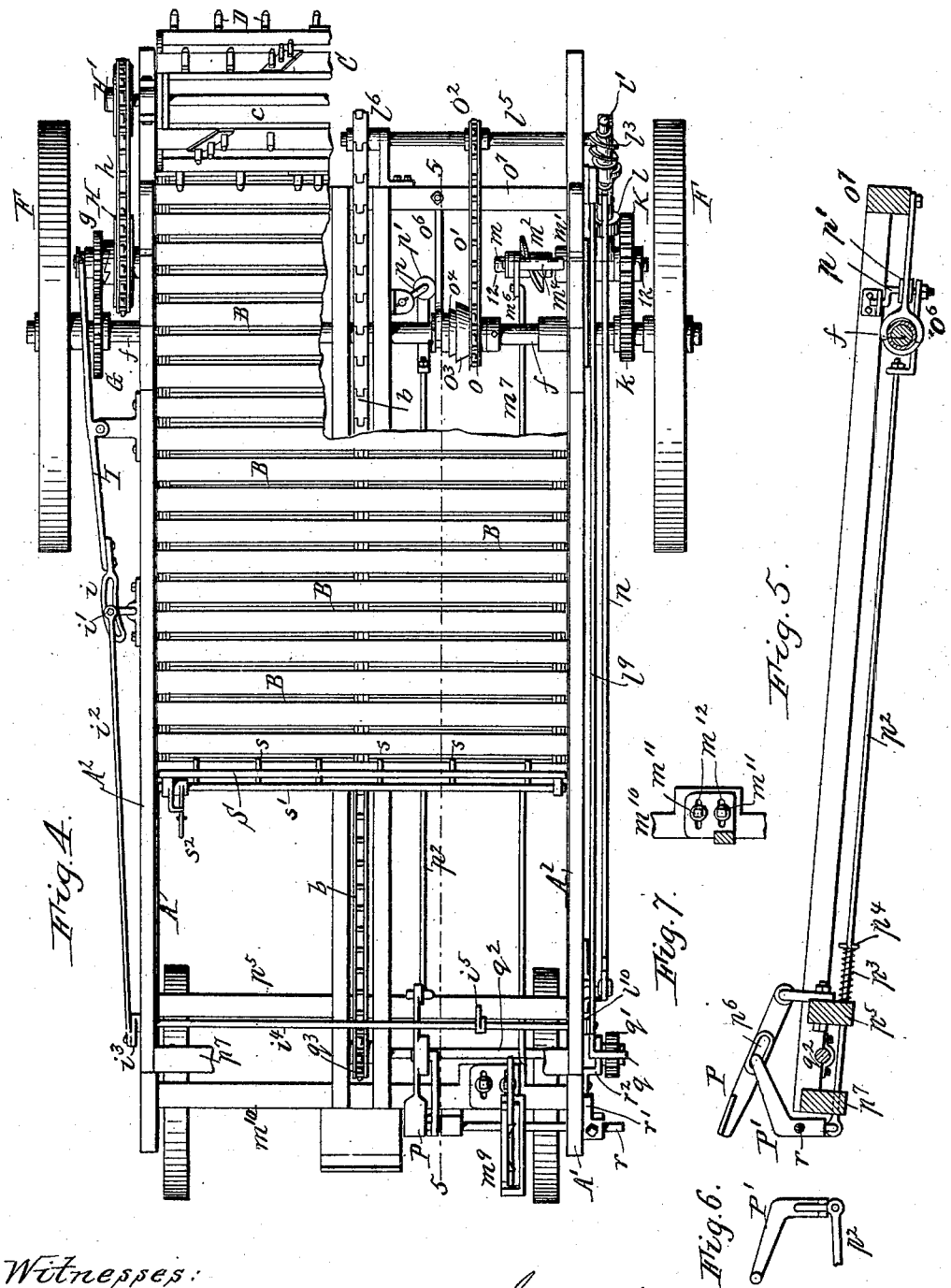

No. 695,212. Patented Mar. 11, 1902.
J. S. KEMP.
FERTILIZER DISTRIBUTER.
(Application filed June 3, 1901.)
(No Model.) 4 Sheets—Sheet 3.
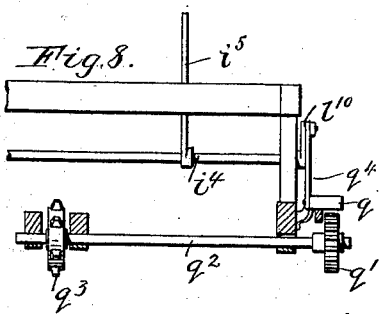
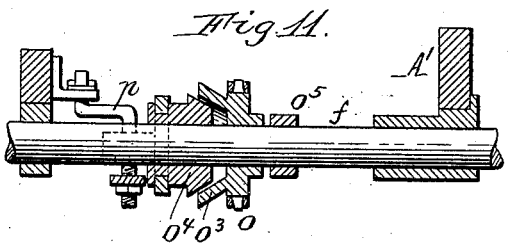
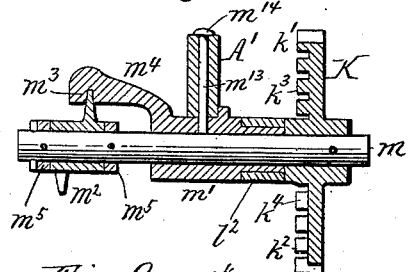
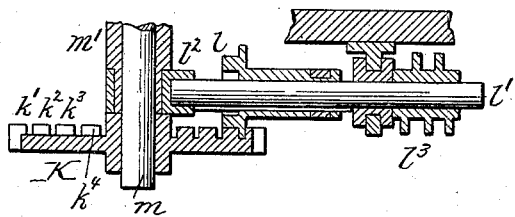
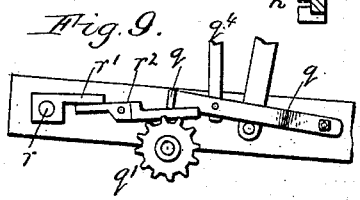
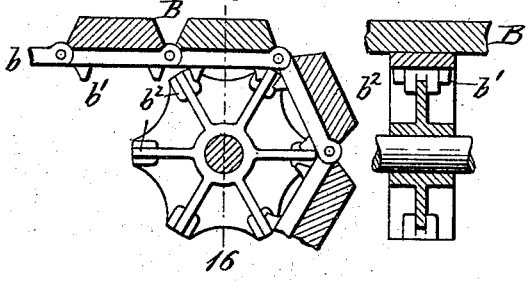
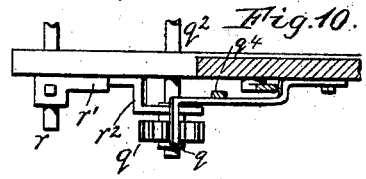
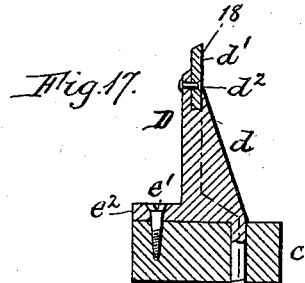
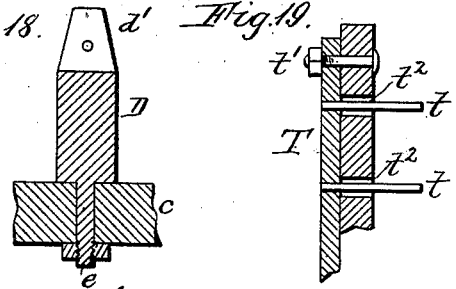
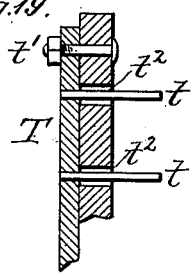
Witnesses:
Henry L. Deck.
F. F. Scheyinger.
Joseph S. Kemp  Inventor.
By Wilhelm Bonner
Attorneys.

No. 695,212. Patented Mar. 11, 1902.
J. S. KEMP.
FERTILIZER DISTRIBUTER.
(Application filed June 3, 1901.)

(No Model.) 4 Sheets—Sheet 4.

UNITED STATES PATENT OFFICE.

JOSEPH SARGENT KEMP, OF NEWARK VALLEY, NEW YORK.

FERTILIZER-DISTRIBUTER.

SPECIFICATION forming part of Letters Patent No. 695,212, dated March 11, 1902.

Application filed June 3, 1901. Serial No. 62,826. (No model.)

*To all whom it may concern:*

Be it known that I, JOSEPH SARGENT KEMP, a citizen of the United States, and a resident of Newark Valley, in the county of Tioga and State of New York, have invented new and useful Improvements in Fertilizer-Distributers, of which the following is a specification.

This invention relates to that class of fertilizer-distributers or manure-spreaders which embody a box or body mounted on a wheeled frame, a movable bottom or apron upon which the manure is placed, and a rotary or endless beater against which the manure is slowly fed by the movement of the bottom and by which the manure is picked off and thrown or spread rearwardly from the machine.

The objects of this invention are to improve the mechanism by which the feed movement is imparted to the bottom, to provide a simple and convenient mechanism for returning the bottom to its initial position by power derived from the rear axle when the load has been distributed, to provide the follower-board with means for preventing the last portion of the load of manure from being thrown bodily from the machine, and to improve the beater mechanism.

In the accompanying drawings, consisting of four sheets, Figure 1 is an elevation of the left-hand side of the machine with the left rear wheel removed. Fig. 2 is a longitudinal sectional elevation of the machine with the running-gear omitted. Fig. 3 is a top plan view of the notched plate for locking the hand-lever by which the pinion of the worm-shaft is shifted. Fig. 4 is a top plan view of the machine with parts of the bottom and beater broken away to expose the parts below. Fig. 5 is a longitudinal section of the shipper of the bottom-returning mechanism in line 5 5, Fig. 4, viewed from the left. Fig. 6 is a side elevation of the front elbow-lever of this shipper, viewed from the right. Fig. 7 is a horizontal section in line 7 7, Fig. 2. Fig. 8 is a transverse sectional view of the front sprocket-shaft of the bottom-actuating mechanism in line 8 8, Fig. 1. Fig. 9 is an enlarged side elevation of the releasing devices of the front locking-pawl, showing the latter disengaged. Fig. 10 is a top plan view thereof. Fig. 11 is a fragmentary sectional view, on an enlarged scale, of the friction-clutch on the rear axle. Fig. 12 is a vertical transverse section of the variable-speed gear of the worm-shaft, on an enlarged scale, in line 12 12, Fig. 4. Fig. 13 is a detached view of the spiral cam of this speed-gear. Fig. 14 is a horizontal section of the worm-shaft and connecting parts in line 14 14, Fig. 1. Fig. 15 is a side elevation of the rear sprocket-wheel and part of the movable bottom, on an enlarged scale. Fig. 16 is a transverse section in line 16 16, Fig. 15. Fig. 17 is a sectional side elevation of one of the beater-teeth, on an enlarged scale. Fig. 18 is a sectional front elevation of the same in line 18 18, Fig. 17. Fig. 19 is a horizontal section, on an enlarged scale, showing a modified construction of the retarding-teeth on the follower-board. Fig. 20 is a sectional elevation of the rotary beater in the direction of the axis thereof.

Like letters of reference refer to like parts in the several figures.

A represents the right-hand side sill, A' the left-hand side sill, and $A^2$ the side-boards of the wagon body or box. The movable bottom is composed of transverse slats B and connecting-links $b$.

C represents the rotary beater; $c$, the staves or bars thereof; $c'$, the beater-shaft, and D the teeth secured to the staves.

Heretofore the staves have been connected with the beater-shaft by heads arranged at the ends of the staves and intermediate of the ends and all secured rigidly to the shaft, so that the beater was rigid and unyielding. When such a beater meets a sudden resistance, which can happen in various ways, the parts composing the beater are subjected to severe and sometimes destructive strain. Such a sudden resistance is encountered, for instance, when a stone or frozen lump is caught between the teeth and wedged against the movable apron or when the machine is thrown into gear when the beater is clogged. In order to avoid such sudden strains upon the beater and its driving mechanism, I connect the beater-staves with the shaft in such a way that the staves can yield when the teeth strike an obstruction which would tend to stop the beater. For that purpose the ends of the staves are secured to supporting-heads $c^2$, Figs.

1, 2, and 20, which are mounted loosely upon the shaft $c'$, and the staves are driven intermediate of these loose supporting-heads from the shaft by arms $c^3$, which are attached to a hub $c^4$, secured to the shaft. These arms are preferably made of flat springs and arranged to drive the beater by pushing against the beater-staves; but even if these arms are rigid and rigidly secured to the staves there will be considerable relief afforded by the torsional elasticity of the beater-shaft between the driving mechanism at the end of the beater-shaft and the point where the staves are connected with the shaft, whereby the direct transmission of a sudden strain from the beater-staves to the driving mechanism is prevented. One set of these intermediate driving-arms is shown, but more may be employed between the loose supporting end heads in a long beater.

Each tooth D is composed of a shank or body $d$, Figs. 17 and 18, and a face-plate $d'$, secured to the end of the shank by a light rivet $d^2$ or some other suitable fastening device, which can be removed when the face-plate is worn out and requires to be replaced. The shank is constructed of cast-iron and the face-plate of steel or some other hard metal which is well adapted to resist wear. The shank is provided with a fastening-bolt $e$, by which it is secured to the stave $c$, and the tooth may be further secured by a screw $e'$, passing through an ear $e^2$.

$f$ represents the rear axle, and F the rear wheels secured thereto.

The mechanism by which the beater is driven from the rear axle is arranged, as usual, on the right-hand side of the machine and may be constructed in any suitable or well-known manner. As shown in the drawings, particularly Fig. 4, it consists of a gear-wheel G, secured to the rear axle, a pinion $g$, having a clutch-face, a sprocket-wheel H, having a corresponding clutch-face, a sprocket-wheel H', secured to the beater-shaft, and a drive-chain $h$. The pinion $g$ is moved in and out of gear by a well-known shifting device consisting of a lever I, engaging at its rear end with the pinion and provided at its front end with a slotted segment $i$, a rock-arm $i'$ engaging in said segment, a rod $i^2$, extending from said rock-arm forwardly to an arm $i^3$ on a horizontal transverse shaft $i^4$, which is arranged at the front end of the box and provided with a hand-lever $i^5$.

The mechanism by which the movable bottom is driven from the rear axle is arranged, as usual, on the left-hand side of the machine.

$k$, Figs. 1 and 4, represents the gear-wheel, which is secured to the rear axle for driving the bottom, and K represents the gear-disk, which is driven from this gear-wheel and which is provided on its inner side with several concentric gear-rims $k'$ $k^2$ $k^3$ $k^4$, either of which can be engaged with the driving-pinion $l$ on the worm-shaft $l'$, by which the movable bottom is actuated. The speed of the worm-shaft and of the movable bottom and the quantity of fertilizer which is discharged while the machine travels a certain distance is regulated by causing a larger or smaller gear-rim to mesh with the pinion in a well-known manner. These variable-speed gears were heretofore so constructed that the gear-disk turned loosely upon a stud or arbor and had to be unfastened and moved away from the pinion on the worm-shaft. The pinion was then shifted on the worm-shaft so as to bring it in line with the appropriate gear-rim, and the gear-disk was then moved back into mesh with the pinion and secured in position. This operation was laborious and required the stopping of the machine and the dismounting of the operator for making the change.

My improved variable-speed gear is so contrived that the operator can make the change from his seat at the front without stopping the machine and is constructed as follows: The gear-disk is secured to the outer end of a short horizontal shaft $m$, which is arranged transversely in rear of the gear-wheel $k$ and journaled in a bearing $m'$ on the under side of the left-hand sill A', Figs. 1, 2, 12, and 14. This shaft is capable of sufficient lateral movement in its bearing to throw the gear-rims of the disk in or out of mesh with the driving-pinion $l$ on the worm-shaft. For the purpose of shifting the shaft and gear-disk from one position to the other the inner end of the shaft is provided with a spiral cam $m^2$, Figs. 2, 4, 12, and 13, which engages in a guide-groove $m^3$ in the under side of an arm $m^4$, projecting inwardly from the bearing $m'$. This cam is mounted loosely on the shaft $m$ between collars $m^5$. By turning the cam in one direction or the other the shaft is shifted lengthwise in its bearing to throw the disk in or out of mesh with the pinion. For operating the cam and holding it in position the cam is provided with an arm $m^6$, which is connected by a rod $m^7$ with a hand-lever $m^8$ at the front of the machine, on the left-hand side thereof, near the driver's seat. (Not shown.) This hand-lever is locked in position on a notched segment $m^9$, which is secured upon one of the front cross-timbers $m^{10}$ of the frame. The segment is preferably made adjustable in the longitudinal direction of the machine by any suitable means—for instance, as shown in Fig. 7, by bolts $m^{11}$, passing through slots $m^{12}$. The bearing $m'$ is provided with an oiling-aperture which is arranged underneath an oil-passage $m^{13}$ in the side sill A', Fig. 12. This oil-passage is closed by a pin or plug $m^{14}$, whereby dirt is excluded, and which is withdrawn for oiling the parts.

The worm-shaft $l'$ extends rearwardly from the shaft $m$ and is journaled at its front end in a bearing $l^2$, mounted loosely concentric with the shaft $m$—for instance, as shown in Figs. 12 and 14—on the bearing $m'$, adjacent to the disk-wheel K. $l^3$ is the worm which is secured to the rear end of the shaft $l'$ and which meshes with a wheel $l^4$ on the horizontal shaft $l^5$, to which the rear sprocket-wheel or spider $l^6$ is secured, by which the feed movement is transmitted to the bottom. $l^7$, Fig. 1, is a vertically-movable bearing in which the worm-shaft $l'$ is journaled in front of the worm and which is raised and lowered by a slotted segment $l^8$ in a well-known manner. This segment is shifted by a rod $l^9$ and arm $l^{10}$ from the same front shaft $i^4$ from which the beater is coupled and uncoupled, so that this worm is lifted out of gear when the beater is uncoupled and thrown into gear when the beater is coupled, thereby stopping and starting the bottom with the beater.

The pinion $l$ is mounted on the worm-shaft by a key or feather and can be adjusted on the shaft toward and from the shaft $m$ for engaging the pinion with either of the concentric faces of the disk wheel. The pinion is adjusted on the worm-shaft by a rod $m$, which is attached at its rear end to a collar $n'$, embracing the hub or sleeve of the pinion. This rod extends forwardly on the left-hand side of the box to a hand-lever $n^2$, which is arranged in convenient reach of the driver and held in position by engaging in one of a series of notches $n^3$, formed in a plate $n^4$. This plate is shown in Figs. 1 and 3 and is removed in Fig. 4 to show the parts below the plate. The notches in this plate are so arranged that the lever can be adjusted to hold the pinion in engagement with either of the concentric gear-rims of the disk wheel.

When it is desired to stop the feed-movement of the bottom temporarily without stopping the beater, the disk wheel K is moved out of engagement with the pinion $l$ by means of the lever $m^8$. This stops the feed-movement of the bottom, while the beater continues to run, which is desirable in turning a corner in the field or in passing over a piece of ground upon which no manure is to be spread.

When it is desired to change the speed of the feed-movement of the bottom, the disk wheel is disengaged from the pinion $l$ by the lever $m^8$, as described, the pinion $l$ is shifted by the lever $n^2$ to engage with the gear-rim, producing the desired speed, and the disk wheel is returned to engagement with the pinion by the lever $m^8$. All of these operations are effected by the operator from the front end of the machine without dismounting.

The mechanism by which the bottom is returned to its initial position when the load has been distributed is constructed as follows: O is a sprocket-wheel which is mounted loosely on the rear axle and connected by an endless chain $O'$ with a similar wheel $O^2$ on the shaft $l^5$ of the rear sprocket-wheel $l^6$. The sprocket-wheel O is provided on one side with a hollow friction-cone $O^3$, in which engages a shifting cone $O^4$, mounted on the rear axle by a key, so that the cone $O^4$ when pressed against the cone $O^3$ will drive the latter and the sprocket-wheel O and through the latter the bottom in the proper direction to return the latter to its initial position, in which the follower-board stands at the front end of the box. The sprocket-wheel O abuts against a collar $O^5$ on the axle. The cone $O^4$ is shifted from the front end of the machine by any suitable mechanism. As shown in Figs. 4, 5, and 11, the cone is grasped by the bifurcated front end of an arm $O^6$, which is pivoted at its rear end to the rear cross-piece $O^7$ of the frame of the machine. This cone is pressed against the cone $O^3$ of the sprocket-wheel by a rock-arm $p$, which is provided at its free lower end with a roller $p'$, which bears against the arm $O^6$, Fig. 4. This rock-arm is shifted by a rod $p^2$, which extends forwardly to the front part of the machine and is held in its rearmost position by a spring $p^3$, arranged between a collar or stop $p^4$ on the rod and one of the front cross-pieces $p^5$ of the frame. This rod is shifted by a foot-lever P, which is connected with an elbow-lever P' by a slotted connection $p^6$ in such a way that by depressing this foot-lever the rod is drawn forward, throwing the friction-clutch into gear and driving the rear sprocket-wheel so as to move the bottom forwardly. The foot-lever is supported on the cross-piece $p^5$ and the elbow-lever on the foremost cross-piece $p^7$, Figs. 2, 4, and 5. Upon releasing the foot-lever the shifting cone $O^4$ is disengaged from the hollow cone $O^3$ and the sprocket-drive is released. When the load has been spread and the bottom is to be returned, the worm is thrown out of gear with the worm-wheel on the rear sprocket-shaft $l^5$. Ordinarily when the worm is thrown out of gear the bottom must be held against accidental movement by a pawl $q$, which engages a toothed wheel $q'$ on the left-hand end of the front shaft $q^2$, which carries the front sprocket-wheel or spider $q^3$, Figs. 1 and 4. This pawl is connected by a link $q^4$ with the arm $l^{10}$ on the front rock-shaft $i^4$, Figs. 1, 4, and 8, in a well-known manner, so that the pawl is lowered into engagment with the toothed wheel when the worm is raised and raised out of engagement when the worm is lowered. When the bottom is to be returned by the above-described power mechanism, it is necessary to disengage the worm, as described, and it is also necessary to release the locking-pawl $q$. For this purpose the rock-shaft $r$, Figs. 6, 7, and 9, to which the elbow-lever P' is secured, is provided at its left-hand end with a finger $r'$, which engages upon the front arm of a lever $r^2$. The rear arm of this lever projects underneath the pawl $q$. Upon depressing the foot-lever P for throwing the friction-clutch into gear the movement of the elbow-lever P' causes the finger $r'$ to actuate the lever $r^2$ in such manner that the rear arm of this lever lifts the pawl $q$ from the wheel, as shown in Fig. 9. Upon releasing the foot-lever the spring $p^3$ returns the parts to their former position and allows the pawl to drop back into engagement with the wheel. The link $q^4$ has a slotted connection $q^5$ with the arm $l^{10}$, which permits the upward movement of the pawl for disengaging the latter.

If by inadvertence the worm should not be thrown out of gear when the return mechanism of the bottom is thrown into gear, there would be a conflict between the two mechanisms, the worm driving the bottom rearward and the return mechanism driving the bottom forward. If the return mechanism were positively coupled to the rear axle, a breakage would necessarily result in these circumstances; but as the return mechanism is coupled to the rear axle by a friction device no breakage can result, as the friction is overcome by the more powerful worm mechanism, which latter moves the bottom rearwardly notwithstanding this friction until the difficulty is discovered and remedied.

S represents the follower-board, which is secured to the front end of the movable bottom in the usual way. This board is provided with rearwardly-projecting teeth or pins $s$, Figs. 2 and 4, which enter the manure lying next to the rear side of the board and hold the manure temporarily against the action of the beater-teeth. It often happens that when the follower-board has nearly reached the beater and there is but a small quantity of manure left between the beater and the board and the manure is matted or consists largely of straw or other light material the entire body of manure remaining between the beater and the board is picked up by the beater-teeth and thrown out in a body. The teeth $s$ hold back or retard the last portion of the manure and prevent it from being discharged in this way. As shown in Figs. 2 and 4, these teeth are adjustable, so that they can be pointed more or less downwardly in order to hold back the manure more or less, as may be desired. For that purpose each horizontal row of teeth $s$ is secured to a horizontal shaft $s'$, which is journaled on the front side of the follower-board. Two rows of teeth and two shafts are shown in these figures, one above the other, and the two shafts are connected by rock-arms $s^2$ $s^3$ and a rod $s^4$, so that both shafts are adjusted simultaneously. The upper arm $s^2$ is extended to form a hand-lever by which the teeth can be adjusted. This lever is held in its adjusted position by a notched segment $s^5$ and any suitable catch-pin.

In the construction of the retarding-teeth represented in Fig. 19 the teeth $t$ are rigidly secured to a board T, which is removably attached to the follower-board on the front side of the latter by bolts $t'$ or other suitable means. The teeth project rearwardly through openings $t^2$ in the follower-board.

The links $b$ of the bottom are preferably provided on their under sides with teeth $b'$, Figs. 15 and 16, which straddle lugs $b^2$ on the arms of the spider or sprocket-wheel, whereby the bottom is held against lateral displacement.

I claim as my invention—

1. In a fertilizer-distributer, the combination of a movable bottom, a driving-axle, a longitudinal shaft interposed between said axle and said bottom for transmitting the feed movement to the latter, a driving-pinion on said shaft, a driving gear-wheel which meshes with said pinion and which is movable toward and from said pinion, means for driving said gear-wheel from said axle, a shifting mechanism whereby said gear-wheel can be moved transversely into and out of mesh with said pinion, a shifting and holding device arranged at the front of the machine, and connecting means extending from said shifting and holding device rearwardly to said shifting mechanism, whereby said gear-wheel can be shifted from the front of the machine into or out of mesh with said gear-wheel for driving or stopping the bottom, substantially as set forth.

2. In a fertilizer-distributer, the combination of a movable bottom, a driving-axle, a longitudinal shaft interposed between said axle and said bottom for transmitting the feed movement to the latter, a driving-pinion which is movable on said shaft in the longitudinal direction thereof, an adjusting and holding device arranged at the front end of the machine and connected with said pinion for adjusting the latter on said shaft and holding it in its adjusted position, a driving gear-wheel provided with concentric gear-rims, either of which can mesh with said pinion, said wheel being movable toward and from the pinion, means for driving said gear-wheel from said axle, a shifting mechanism whereby said gear-wheel can be moved transversely toward and from said pinion, and a shifting and holding device arranged at the front end of the machine and connected with said shifting mechanism, substantially as set forth.

3. In a fertilizer-distributer, the combination of a wagon-body, a movable bottom, a rear axle, a longitudinal shaft which is geared with the bottom for transmitting the feed movement to the same, a driving-pinion on said shaft, a driving gear-wheel which receives motion from said rear axle and which is adapted to mesh with said pinion, a transverse shaft arranged in rear of said axle and carrying said gear-wheel, and means for shifting said shaft lengthwise to throw said gear-wheel into and out of mesh with said pinion, substantially as set forth.

4. In a fertilizer-distributer, the combination of a wagon-body, a movable bottom, a rear axle, a longitudinal shaft which is geared with the bottom for transmitting the feed movement to the same, a driving-pinion on said shaft, a driving gear-wheel which receives motion from said rear axle and which is adapted to mesh with said pinion, a transverse shaft arranged in rear of said axle and carrying said gear-wheel, a shifting cam mounted on said shaft, a fixed guide in which said cam engages, and means whereby said cam is moved in said guide for shifting the shaft and throwing the gear-wheel into and out of mesh, substantially as set forth.

5. In a fertilizer-distributer, the combination of a wagon-body, a movable bottom, a rear axle, a transverse shaft arranged in rear of said axle, a bearing in which said shaft is journaled and in which said shaft can be moved lengthwise, a driving gear-wheel secured to the outer end of said shaft, means for shifting said shaft in said bearing, a longitudinal shaft arranged in rear of said transverse shaft, a bearing journaled upon the outer end of the bearing of said transverse shaft and receiving the front end of said longitudinal shaft, a driving-pinion on said longitudinal shaft, and gearing connecting said longitudinal shaft with said movable bottom, substantially as set forth.

6. In a fertilizer-distributer, the combination of a movable bottom, a driving-axle, a feeding driving mechanism connecting said axle with said bottom and driving said bottom rearwardly, a returning mechanism connecting said axle with said bottom and driving said bottom forwardly, and a frictional driving device arranged in said return mechanism and driving said bottom forwardly but permitting said bottom to be driven rearwardly by the preponderance of the feeding driving mechanism when the latter and the returning mechanism are both in operation at the same time, substantially as set forth.

7. In a fertilizer-distributer, the combination of a movable bottom, an axle, a feeding driving mechanism connected with said bottom for moving the same rearwardly, a returning mechanism embodying a driving-wheel loosely mounted on said axle and provided with a friction-cone, a shifting cone mounted on said axle and driven thereby, a rock-arm for pressing said shifting cone against the cone of said driving-wheel, a shifting rod extending from said rock-arm forwardly, a spring whereby said rod is yieldingly held in the uncoupled position, and a shifting lever arranged at the front of the machine for moving said rod to the coupled position, substantially as set forth.

8. In a fertilizer-distributer, the combination of a movable bottom, a shaft and sprocket-wheel at the front of the machine connected with said bottom, a toothed detent-wheel on said shaft, a locking-pawl for said detent-wheel, a returning mechanism connected with said bottom for moving the latter forwardly, a shifting lever at the front of the machine for throwing said returning mechanism into gear, and a releasing mechanism for said detent-pawl connected with said shifting lever, substantially as set forth.

9. In a fertilizer-distributer, the combination of a movable bottom, a shaft and sprocket-wheel at the front of the machine connected with said bottom, a toothed detent-wheel on said shaft, a locking-pawl for said detent-wheel, a returning mechanism connected with said bottom for moving the latter forwardly, a shifting lever arranged at the front of the machine for throwing said returning mechanism into gear, an elbow-lever interposed between said shifting lever and said returning mechanism, a releasing-finger connected with said elbow-lever, and a lever interposed between said finger and said pawl for releasing the latter by operating said shifting lever, substantially as set forth.

10. The combination of a wagon-body, a beater, a movable bottom, a follower secured thereto, and retarding-teeth arranged on said follower, substantially as set forth.

11. The combination of a wagon-body, a beater, a movable bottom, a follower secured thereto, and retarding-teeth mounted adjustably on said follower, substantially as set forth.

12. The combination of a wagon-body, a beater, a movable bottom, a follower secured thereto, a transverse shaft adjustably mounted on said follower, and retarding-teeth secured to said shaft, substantially as set forth.

13. The combination of the beater-shaft, beater-staves, end supports for the staves which are loosely mounted on the beater-shaft, and an intermediate driving device connecting the staves with the beater-shaft, substantially as set forth.

14. The combination of the beater-shaft, beater-staves, and yielding arms connecting the staves with the shaft, substantially as set forth.

15. The combination of the beater-shaft, beater-staves, end heads supporting the staves and mounted loosely on the beater-shaft, and yielding arms connecting the staves with the shaft intermediate of the end heads, substantially as set forth.

16. The combination with the beater-staves, of beater-teeth which are composed of shanks secured to the staves and face-plates which are secured to and separable from said shanks, substantially as set forth.

Witness my hand this 28th day of May, 1901.

JOSEPH SARGENT KEMP.

Witnesses:
 J. S. LEWIS,
 W. B. ELWELL.